(12) United States Patent
Price

(10) Patent No.: US 10,239,667 B2
(45) Date of Patent: Mar. 26, 2019

(54) CLOSURE FOR RETORT CONTAINER

(71) Applicant: Sonoco Development, Inc., Hartsville, SC (US)

(72) Inventor: Trevor Price, North Canton, OH (US)

(73) Assignee: Sonoco Development, Inc., Hartsville, SC (US)

( * ) Notice: Subject to any disclaimer, the term of this patent is extended or adjusted under 35 U.S.C. 154(b) by 687 days.

(21) Appl. No.: 14/307,824

(22) Filed: Jun. 18, 2014

(65) Prior Publication Data

US 2015/0368000 A1 Dec. 24, 2015

(51) Int. Cl.
*B65D 41/00* (2006.01)
*B65D 41/04* (2006.01)
*B29C 65/36* (2006.01)
*B65D 51/20* (2006.01)

(52) U.S. Cl.
CPC ...... *B65D 41/0492* (2013.01); *B29C 65/3644* (2013.01); *B65D 51/20* (2013.01)

(58) Field of Classification Search
CPC .......................... B65D 41/02492; B65D 51/20
USPC .................................................... 215/40, 315
See application file for complete search history.

(56) References Cited

U.S. PATENT DOCUMENTS

| | | | |
|---|---|---|---|
| 3,637,102 A * | 1/1972 | Shaw | B65D 51/002 215/247 |
| 4,782,968 A | 11/1988 | Hayes | |
| 4,991,731 A | 2/1991 | Osip et al. | |
| 5,002,198 A | 3/1991 | Smith | |
| 5,277,874 A * | 1/1994 | Vasta | A23L 3/001 249/121 |
| 6,065,623 A | 5/2000 | Hierzer et al. | |
| 6,276,543 B1 | 8/2001 | German et al. | |
| 6,302,321 B1 | 10/2001 | Reese et al. | |
| 6,637,176 B1 | 10/2003 | Krall | |
| 6,694,596 B2 | 2/2004 | Hierzer et al. | |
| 6,857,561 B2 | 2/2005 | Williams et al. | |
| 6,881,286 B2 | 4/2005 | Drummond et al. | |
| 7,364,779 B2 | 4/2008 | Nomula | |
| 7,798,359 B1 * | 9/2010 | Marsella | B32B 7/12 215/232 |
| 8,650,839 B1 | 2/2014 | Robinson et al. | |

(Continued)

FOREIGN PATENT DOCUMENTS

WO 2013107899 A1 7/2013

OTHER PUBLICATIONS

International Search Report and Written Opinion for corresponding international application No. PCT/US2015/036457, dated Dec. 9, 2015.

*Primary Examiner* — Anthony Stashick
*Assistant Examiner* — Raven Collins
(74) *Attorney, Agent, or Firm* — Flaster/Greenberg P.C.

(57) ABSTRACT

A retortable container is formed with an opening formed defined by a projecting rim. The rim includes an external surface and securing structure formed thereon. A flexible membrane is sealed to the rim and closes the opening. A closure is provided having a molded plastic tubular ring and a separately formed molded plastic disk. The tubular ring includes an overlapping flange at a top and directed inwardly towards an inwardly positioned open area. The skirt includes an engagement structure for securing the closure to the external surface of the rim. The disk is separately attached to the ring within the open area after the retort process is applied to the sealed bottle.

8 Claims, 7 Drawing Sheets

(56) References Cited

U.S. PATENT DOCUMENTS

| | | |
|---|---|---|
| 2005/0145630 A1 | 7/2005 | Williams |
| 2005/0255266 A1 | 11/2005 | Nomula |
| 2008/0142521 A1* | 6/2008 | El-Afandi .............. B65D 77/20 220/271 |
| 2013/0008904 A1* | 1/2013 | Minnette ............... B29C 65/087 220/270 |
| 2015/0114923 A1 | 4/2015 | Horz |

* cited by examiner

US 10,239,667 B2

CLOSURE FOR RETORT CONTAINER

FIELD OF THE INVENTION

The present disclosure relates to containers for products, and more particularly relates to retort containers for food.

BACKGROUND

Retort containers are hermetically sealed after filling with a food product, and are then heated to a temperature of at least about 220° F. for a period of time to ensure that all microorganisms in the container have been killed. Cycle times for heating or cooking the container contents typically exceed 10 minutes. As the temperature rises, the pressure inside the container also increases. An overpressure control system is often used to reduce the pressure differential between the inside and outside of the container. As such, the pressure differential typically does not exceed 5 pounds per square inch (psi). After heating, retort containers typically do not require refrigeration prior to opening and consuming the contents. Retort containers can be stored for extended periods in their sealed condition.

For many years, metal cans were the predominant type of retort containers. Plastic retort containers have been developed. In plastic retort containers, the container lid must be hermetically sealed to the container with sufficient strength to withstand the elevated temperature and pressure conditions during the retort operation. However, the seal strength must be limited so that the consumer may readily remove the lid and seal. Other requirements for all-plastic retort containers and lids include high-barrier performance against water vapor and oxygen, and fast sealing speed.

An all-plastic retort container having a sealing membrane that is adhesively sealed to the container (as opposed to being heat-sealed to the container) is disclosed in Nomula US 2005/0255266 A1.

A high-barrier plastic closure for a retort container is disclosed in Nomula U.S. Pat. No. 7,364,779 and Williams et al. US2005/0145630 A1.

A composite closure for a retort container is disclosed in German et al. U.S. Pat. No. 6,276,543. The closure includes a metal disk for covering the container opening. The disk is retained by an outer band that is threaded onto the rim of the container.

SUMMARY

In one aspect of the disclosure, a retortable container is provided, for example a bottle, for storing product. A reservoir is defined within the container and an opening is provided for discharge of the product. The opening is formed within an upstanding rim projected from the reservoir body. The rim includes an external surface and may further include securing means thereon. A membrane is directly secured to the rim, closing the opening and sealing the reservoir contents. The membrane is preferably formed from a flexible material and seals the product within the reservoir. A closure is provided in the form of a tubular ring and a separately formed disk. The tubular ring includes a skirt formed about a central axis and an overlap flange portion at a top end of the skirt. The flange is directed inwardly towards the central axis. An open area is provided radially inward of the flange. Engagement means may be provided on an inside wall of the skirt for engaging the rim securing means. The separate disk structure is provided and conforms to the dimensions of the open area. The disc is attached to the ring, closing the open area, after the retort process.

In a further aspect of the retortable container the securing means on the container rim and the engagement means on the skirt may be formed as matching threads for coupling the closure to the container rim.

In a further aspect of the retortable container the rim may include a sealing surface and an adhesive seal is provided for fixing the membrane to the sealing surface, hermetically sealing the product within the reservoir. The overlap flange of the tubular ring preferably engages the membrane at the sealing surface in the closed position of the ring on the rim of the container.

Other features of the present invention will become apparent from the detailed description to follow, taken in conjunction with the accompanying drawings.

BRIEF DESCRIPTION OF THE DRAWINGS

For the purpose of illustrating the invention, there is shown in the drawings a form which is presently preferred; it being understood that the invention is not limited to the precise arrangements and instrumentalities shown.

DETAILED DESCRIPTION

Figure 1:
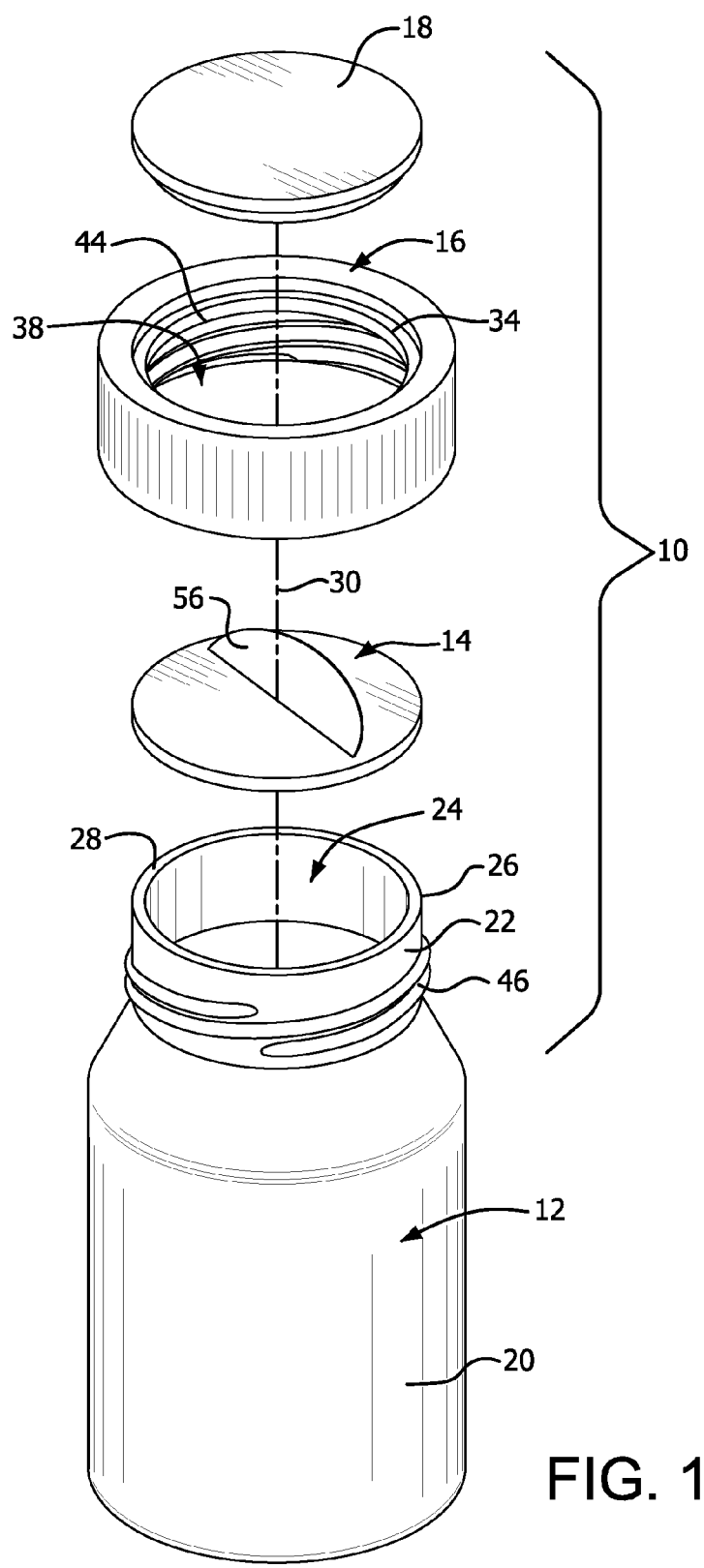
FIG. 1 is an exploded perspective view of an embodiment of a container and closure as contemplated by the present disclosure.

Referring now to the drawings, where like numerals identify like elements, there is shown in FIG. 1 a retortable container construction, which is generally referred to by the numeral 10. The container 10 includes a bottle 12 defining a reservoir therein, a sealing membrane 14, a closure ring 16 and a sealing disk 18. The bottle 12 includes a reservoir body 20 and a projecting neck 22. A discharge opening 24 is defined by the neck portion 22 of the bottle 12. A rim 26 is formed on the top end of the neck 22 and surrounds the opening 24. The rim 26 includes a sealing surface 28 for securing the membrane 14 to the rim 26 and closing the opening 24. As shown, the elements of the container 10 are axially positioned around a central axis line 30.

Figure 2:
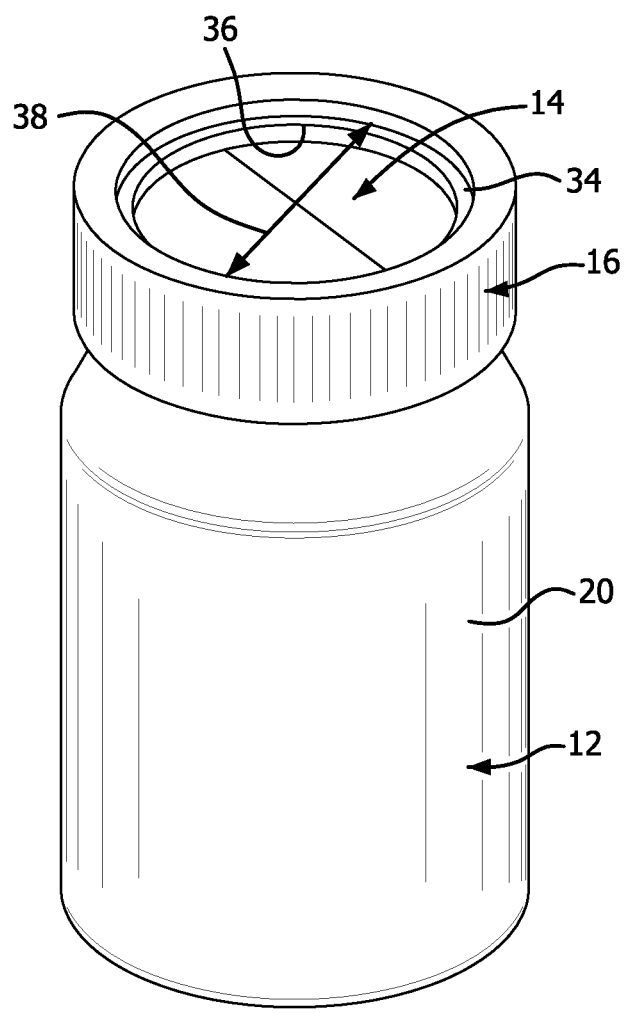
FIG. 2 is a partially assembled perspective view of the container and closure embodiment of FIG. 1.
Figure 3:
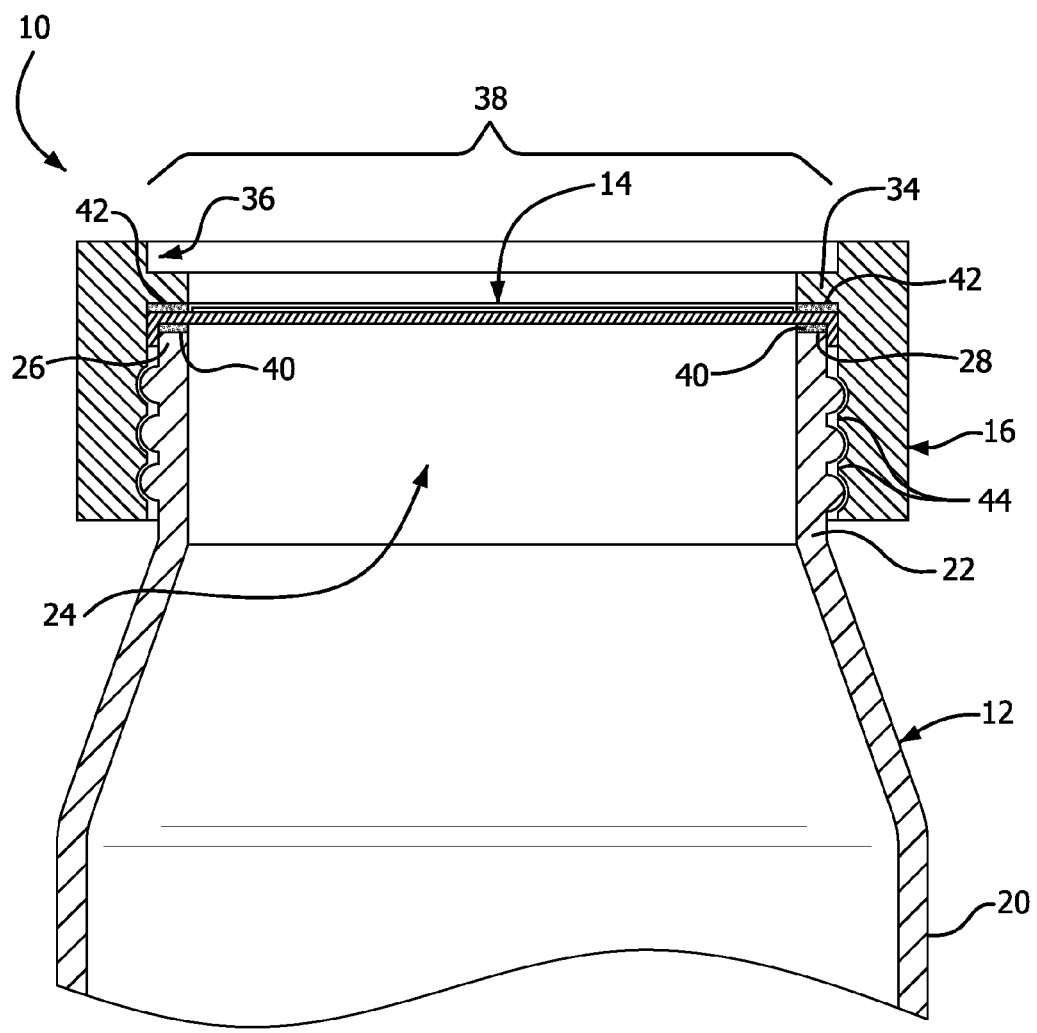
FIG. 3 is a partial cross sectional view of the container and closure embodiment as shown in FIG. 2.

In the intermediate assembly shown in FIG. 2, as also shown in cross section in FIG. 3, the membrane 14 is sealed to the sealing surface 28 of the rim 26. The closure ring 16 is secured to the projecting neck 22 of the bottle 12. The separate disk 18 is not attached to the ring 16. As shown, the ring 16 is formed from a tubular body 32 and an inwardly directed flange 34. The inner rim of the flange 34 defines a disk engagement surface. The flange 34 defines an opening in the closure 18, with the open area 38 overlapping the bottle opening 24, with the membrane 14 positioned there between. As more particularly shown in the cross section of FIG. 3, a seal 40 is provided between the membrane 14 and the sealing surface 28 of the rim 26 of the bottle 12. An adhesive 42 may be provided between the upper surface of the membrane 14 and the lower surface of the flange 34. Engagement means 44 is provided on the inside wall of the closure ring 16, preferably in the form of a threaded surface. A corresponding securing means 46, again preferred to be a threaded surface, is provided on the outside wall of the neck 22 of the bottle 12.

Figure 4:
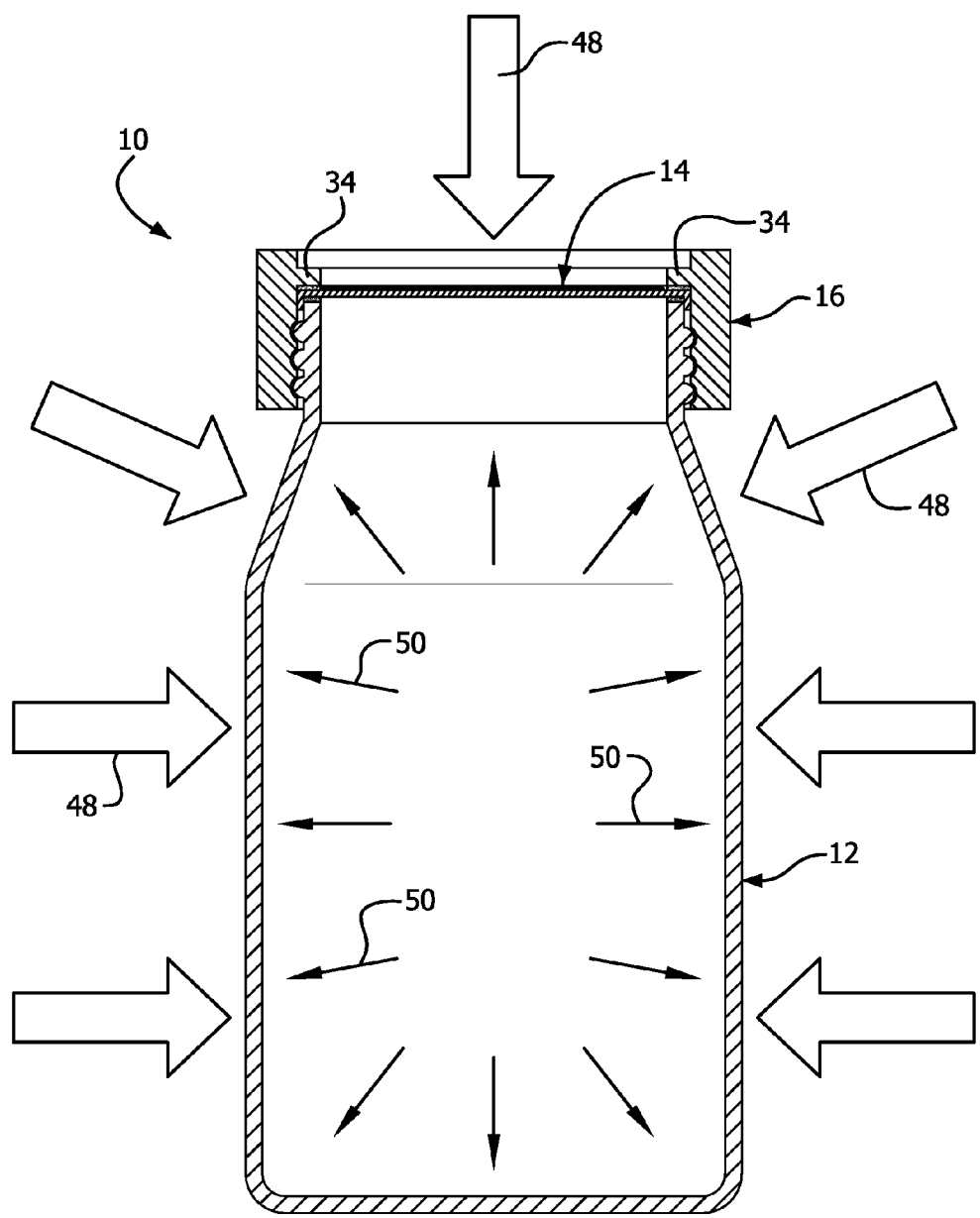
FIG. 4 is a cross sectional view of the container and closure embodiment graphically showing the retort process.

In FIG. 4, there is graphically shown the retort cooking process for the intermediate assembly (FIGS. 2 and 3) of the container 10. Product (not shown) is stored in the reservoir body of the bottle 12 and sealed by the membrane 14. The ring 16 is attached to the neck 22 of the bottle 12 and the inwardly projecting flange 34 overlaps the sealing surface 28 and engages the outer periphery of the membrane 14 as sealed to the sealing surface 28. The sealed bottle 12 is then subjected to an external heating source 48, which may include microwave energy. The applied heat/energy 48 creates heat and pressure 50 within the sealed bottle 12. As shown, the heat/energy 48 is also applied through the membrane 14 covering the open area 38 defined inwardly of the flange 34 on the closure ring 16.

Figure 5:
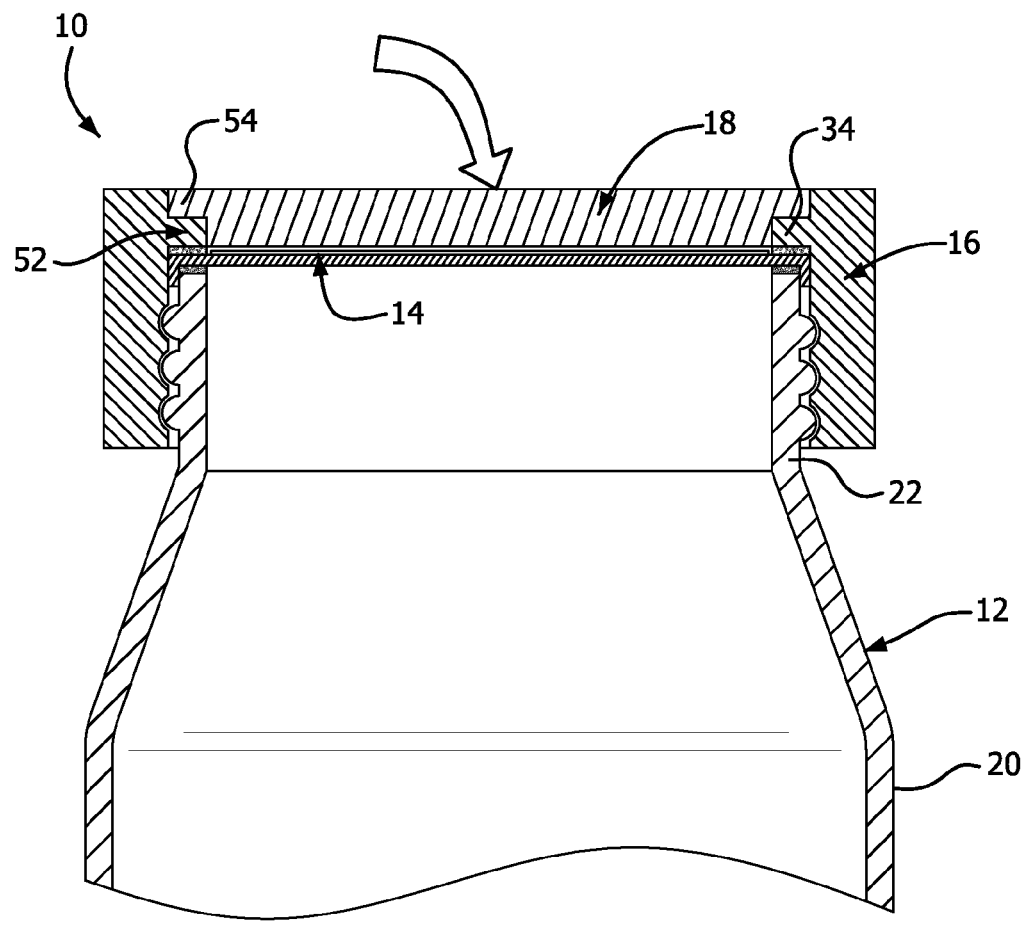
FIG. 5 is a partial cross sectional view of the fully assembled container and closure embodiment according to FIG. 1.

In FIG. 5, there is shown in cross section the final assembly of the container 10. The sealing disk 18 is positioned within the open area 24 as defined by the ring 16 and inwardly directed flange 34. As shown, the flange 34 and body of the ring 16 form a stepped surface 52. The disk 18 preferably includes a similarly stepped surface 54 on its outer periphery. The disk 18 and corresponding surfaces 52, 54 serve to cooperate with one another to retain the disk 18 within the (previously) open area defined by the ring 18. The disk 18 is inserted into the outwardly open area 24 from above the ring 16 and completes the closure formed by the ring 18. The disk 18 is externally inserted and snaps into the opening 38. The preferred engagement between the disk 18 and ring 16 is an interference or friction fit. The dimension tolerances are contemplated to be relatively close, providing a liquid tight seal. The stepped surfaces 36 assist in forming the seal. An adhesive or similar material may be utilized. Other forms of attachment of the plastic disk to the plastic ring may also be used.

Figure 6:
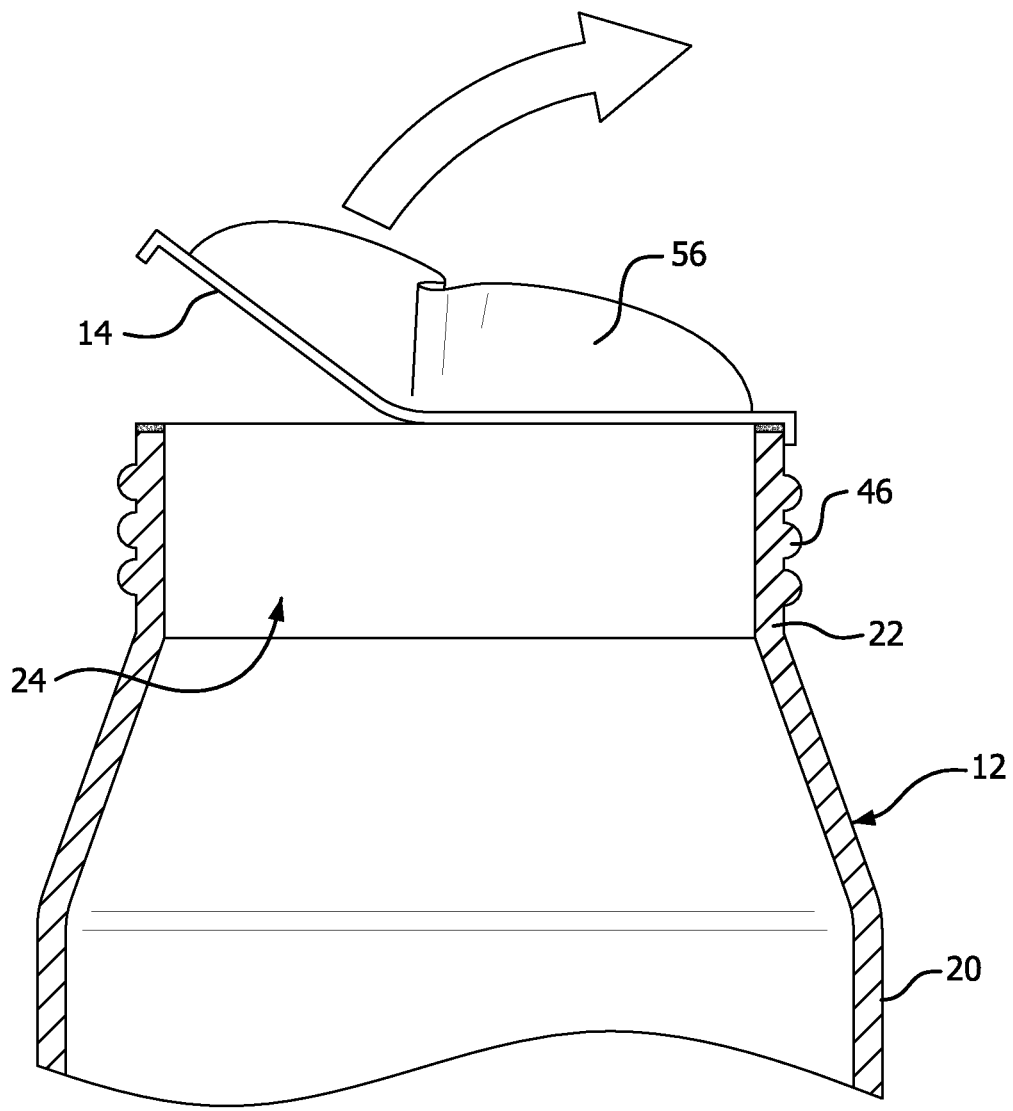
FIG. 6 is a partial cross sectional view of the container showing removal of the sealing membrane portion of the closure.

In FIG. 6, there is shown the removal of the membrane 14 to provide access to the product stored within the reservoir 20 of the bottle 12. As illustrated, the membrane 14 is provided with a gripping tab 56 that may be partially separated from the body of the membrane 14 creating a means for separating the membrane 14 from the sealing surface 28 of the rim 26 of the bottle 12. The gripping tab 56 is exposed by removal of the ring 16 and disk 18 combination (as shown in FIG. 5) from the neck 22 of the bottle 12. The threads or similar means (44, 46) permit the closure to be easily removed from the bottle. Once the membrane 14 is removed, the discharge opening of the bottle 12 is open for discharge of the product.

Figure 7:
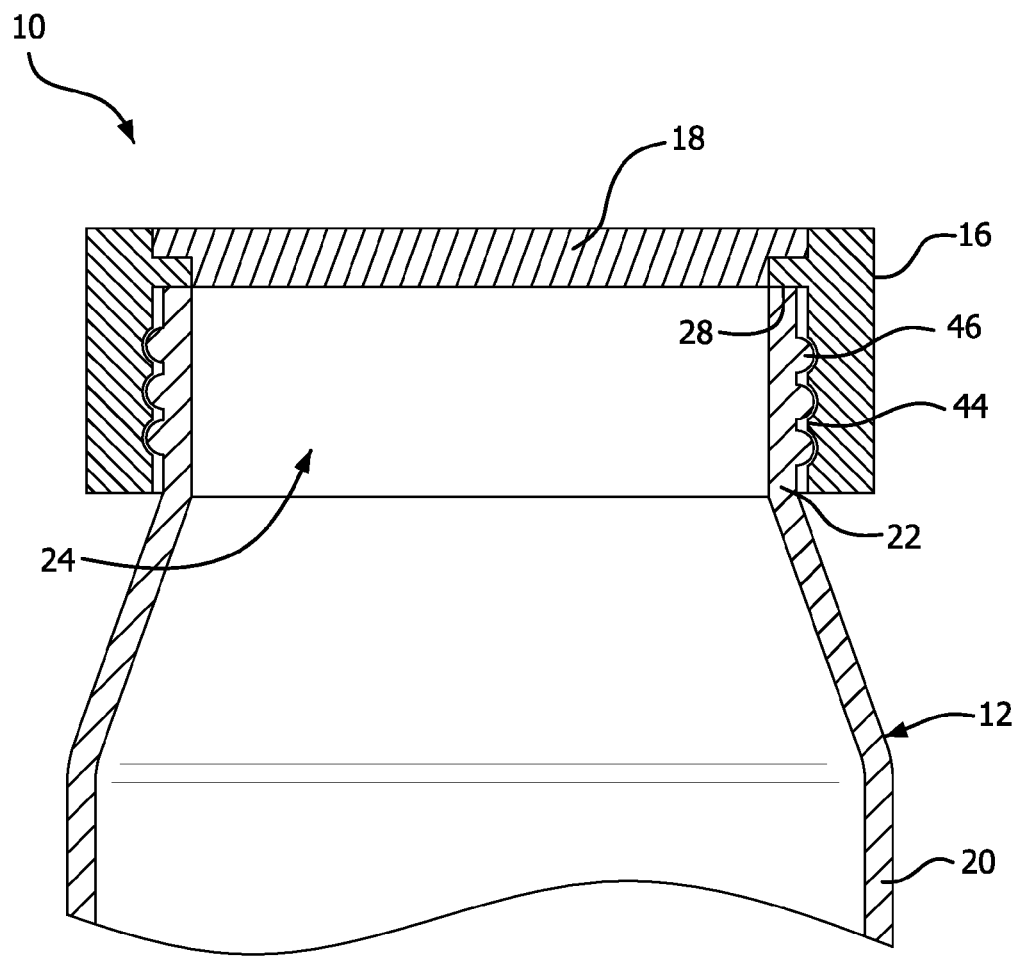
FIG. 7 is a re-assembled container and closure, after removal of the sealing membrane.

The resealing of the bottle 12 is shown in FIG. 7 by the attachment of the closure ring and disk combination 16, 18 to the neck 22 of the bottle 12. The threads 44, 46 (or similar structures) secure the ring 16 and its attached disk 18 to the bottle 12, after removal of the membrane 14. Hence, the product within the reservoir 20 may be partially dispensed after removal of the membrane 14 (FIG. 6) and the bottle 12 resealed by the combination ring 16 and disk 18. It is preferred that the ring 16 be dimensionally formed, such that the flange 34 engages the sealing surface 28 of the rim 26 when the ring 16 returns to seal the reservoir opening 24.

The container 10 is assembled prior the retort process (FIG. 4) without the disk 18, as shown in FIGS. 2 and 3. The adhesive 42 is provided on the upper surface of the membrane 14 or on the bottom surface of the flange 34. This adhesive 44 serves to retain the membrane 14 in position, during application of the ring 16 onto the neck 22 of the bottle 20. Hence, the membrane 14 is secured to the underside of the flange 34 within the ring 16 by the adhesive 42. Upon attachment of the ring 16, the membrane 14 extends across the open area 38. The combination ring 16 and membrane 14 is then applied to the neck 22 of the bottle 20

In the present constructions, the ring 16 is contemplated to be made of a plastic material as formed by an injection molding process. The disk portion 18 of the completed closure is contemplated to also be formed by injection molding. The disk 18 is preferably made of the same material as the ring 16, but may be any compatible material. The preferred material is polypropylene. The closure parts—disk and ring—are preferably made of a single material or monolayer. The disk 18 may be retained within the outwardly open area 38 of the ring 16 by a frictional engagement between the stepped surface 36 of the ring 16 and engagement surface 54 of the disk 18. An adhesive is preferably also provided. Other securing means may be used, such as ultrasonic welding, spin welding, etc.

The membrane 14 may be made of any number of materials. The membrane may be formed from a metal foil patch, forming the barrier layer. A polypropylene sealant layer may be provided on the lower surface of the foil. The polypropylene will serve as a sealant layer and deter fracturing of the foil. A tie layer may be provided between the foil and the polypropylene and an exterior coating may be applied to the polypropylene (or directly to the foil) for forming a fracture layer. A polyester material may be added to the top surface of the foil. The combination of polyester, foil and polypropylene may be formed as a laminate or otherwise. Alternatively, the foil material may be coated on the top with a lacquer or similar material. An organic coating may be applied to the bottom surface of the foil for forming the sealing material for the membrane to the rim surface 28. Other material combinations are possible, beyond these preferred structures.

The membrane is contemplated to be sealed to the sealing surface 28 of the container rim 26 after application of the ring 16 to the rim 26. Generally, the seal is created by an induction heating process. Induction heating or sealing is a non-contact method of heating a metallic material and attaching it to the top of a plastic (or glass) container. The sealing process takes place after the container has been filled and capped. The combination ring 16 and membrane 14 is positioned on the rim 26 before the application of energy. The combination is then passed under an induction coil, which emits an oscillating electromagnetic field. The conductive foil layer begins to heat in the presence of the electromagnetic energy. However, the plastic ring 16 and the container rim 26 are not affected by the energy exposure. The heat from the foil serves to melt the sealing layer on the bottom of the foil, and the polymer sealing material flows onto the rim 26. When cooled, the sealing layer or coating creates a bond with the sealing surface 28 of the container rim 26, resulting in a hermetic seal. Neither the container nor its contents are affected. The cycle time for the energy application is a matter of seconds. The engagement of the ring 16, including the contact of the flange 34 with the portion of the membrane 14 overlapping the rim surface 28, serves to fix the position of the membrane 14 and secure the final seal with the rim 26. The flange engagement is contemplated to support the membrane 14 during retort heating. The resulting pressure differential may cause the membrane to bow outwardly. The bowing angle could potentially serve to create a pealing action at the sealing surface 28. The flange 34 may be formed such that the position of the bowed surface is inward of the sealing surface 28. The flange engagement of the membrane edge further secures the seal during retort.

As an alternative to the induction sealing process, a sealing adhesive may be provided on the sealing surface 28 of the bottle rim 26 or pattern applied on the underside of the membrane 14. Regardless of the form, the seal 40 is contemplated to have strength sufficient to withstand the heat and pressure of the retort process. The engagement of the flange 34 with the perimeter of the membrane 14, by means of securing the ring 16 on the bottle 20, assists in maintaining the seal during retort and thereafter. Further, a fracture layer is preferably provided. As such, removal of the membrane 14 from the sealing surface 28 results in a physical break or tear of the layer, leaving a portion on the sealing surface. This construction simplifies the opening process during removal of the membrane. Other forms of and materials for sealing may also be utilized.

The ring 16 may be removed from the bottle 20, with the membrane 14 remaining sealed to surface 28 on the ring 26 of the bottle 20. The membrane seal 40 is maintained until the membrane is physically peeled from the rim 22 of the bottle 20, such as by use of the gripping tab 56 (FIG. 6). The use of the gripping tab 56 creates a peeling force sufficient for removal of the membrane 14 from the sealing surface 28 of the bottle rim 26.

Because the ring 16 includes an open area 38, the membrane 14 is exposed during the retort process. Hence, heat transfer is not retarded by a closed cap surface. Further, the sealing of the bottle 20 is created by a membrane material 14, rather than a rigid metal disk—which maybe made of coated steel—as often utilized in some retort bottle type applications. Metal disks create a complication with respect to recycling operations, creating operational and mechanical issues during a grinding or similar destructive process.

Additional structures and elements may be added to the ring and disk combination, which forms the completed closure. For example, a tamper evident band may be provided at the base of the ring. One form of such a band includes ratchets that restrict opening of the closure, until the band is separated from the ring or otherwise deformed. Deformation of the bad provides an indication of prior use or tampering with the product within the bottle. Other tamper evident structures are known and may be utilized. Various structures may be molded into the inside surfaces of the ring and the perimeter of the disk. The form of the disk may also vary, for example a change in color or graphics, to permit the use of a generic ring structure within multiple product applications. Other modifications may be made to accommodate marketability needs and desires.

The present disclosure shows and describes one or more exemplary embodiments. It should be understood by those skilled in the art from the foregoing that various other changes, omissions and additions may be made therein, without departing from the spirit and scope of the contemplated invention, with the scope of the invention being defined by the foregoing claims. Further, the terms herein are used in a generic and descriptive sense and are not necessarily for purposes of limitation. The scope of the invention is set forth in the following claims.

What is claimed is:

1. A method of forming of a retort container and closure, comprising the steps of:
    providing a container having an internal reservoir, the container having a defined opening for discharge of product retained within the reservoir, the opening formed within an upstanding rim projected from a reservoir body, the rim having an external surface,
    filling a retortable product within the reservoir of the container,
    securing a sealing membrane to the rim of the container after filling the retortable product within the reservoir, the sealing membrane closing the opening and sealing the retortable product within the reservoir;
    engaging a closure to the external surface of the container rim and over the sealing membrane secured to the rim, the closure formed by a tubular ring, the ring having an annular skirt formed about a central axis, an overlap flange portion at a top end of the skirt directed inwardly from the skirt towards the central axis, an open area radially inward of the flange and engagement means on an inside wall of the skirt for engaging the rim external surface, the open area inward of the flange exposing the sealing membrane,
    heating the retortable product within the sealed reservoir, including directing heat through the open area inward of the flange of the closure and through the exposed portion of the sealing membrane, and
    after the retort heating of the product within the sealed container, securing a disk to the closure within and closing the open area inward of the flange on the closure, the disk covering the previously exposed portion of the sealing membrane.

2. A method as if claim 1 wherein the container rim comprises a sealing surface and further comprising the step of adhesively sealing the membrane to the sealing surface for hermetically sealing the retortable product within the internal reservoir.

3. A method as in claim 2 wherein the flange of the tubular ring engages the sealing membrane to retain the sealing membrane secured to the sealing surface on the rim of the container.

4. A method as in claim 1 wherein the ring and the disk are each molded from a plastic material.

5. A method as in claim 4 wherein the plastic material is polypropylene.

6. A method as in claim 4 wherein the membrane comprises a foil material as a barrier layer.

7. A method as in claim 1, wherein a portion of the disk overlapping the flange and an adhesive securing the disk to the overlapped portion of the flange.

8. A method in claim 1, wherein the flange includes a stepped internal surface and the disk includes a mating peripheral surface, and wherein at least a portion of the mating surface of the disk overlaps a portion of the stepped internal surface of the flange.

* * * * *